Feb. 4, 1936.  G. W. MATHEWS ET AL  2,030,014
METHOD AND APPARATUS FOR PRESERVING FOOD PRODUCTS
Filed April 10, 1931  5 Sheets-Sheet 1

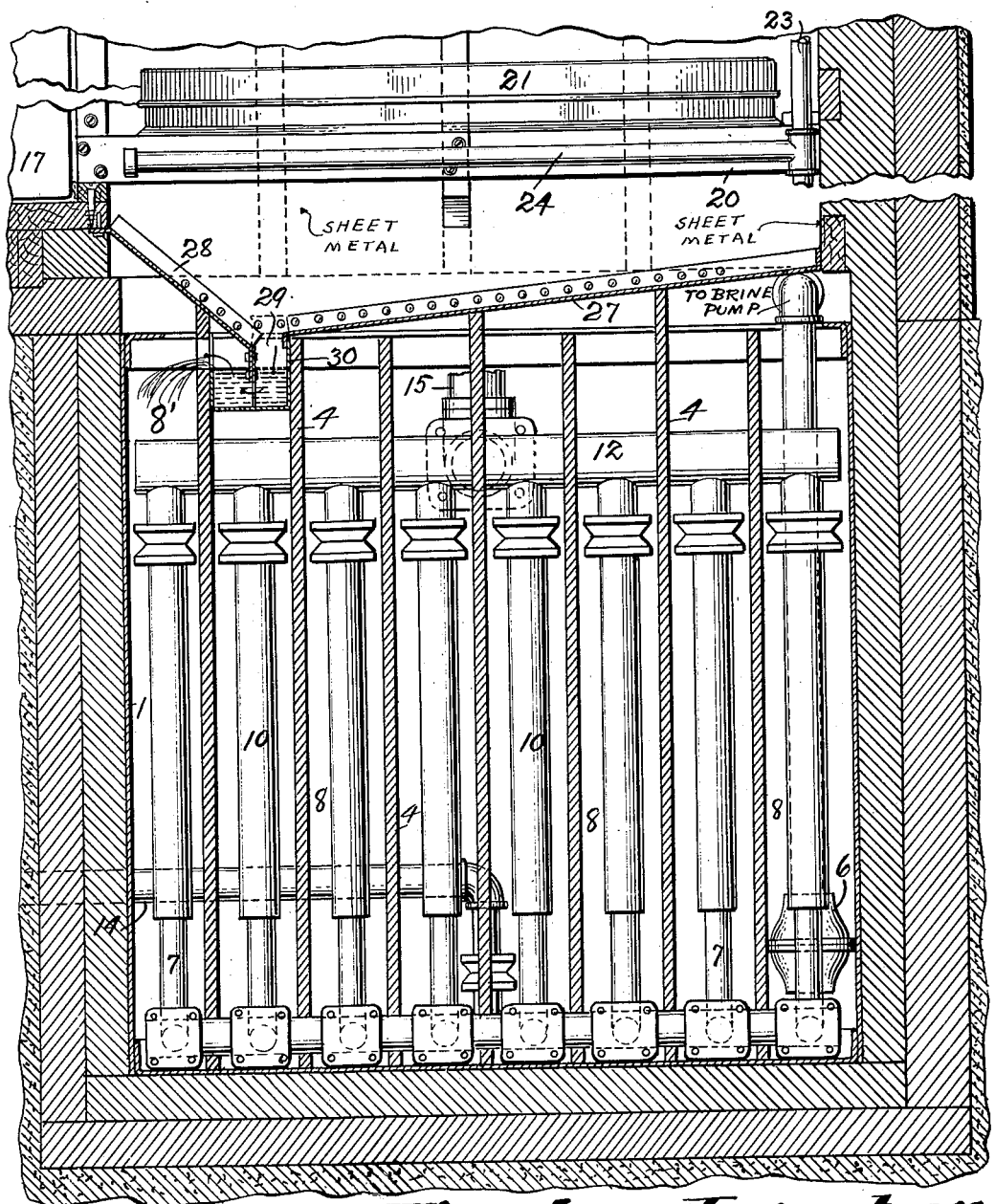

Feb. 4, 1936.  G. W. MATHEWS ET AL  2,030,014
METHOD AND APPARATUS FOR PRESERVING FOOD PRODUCTS
Filed April 10, 1931  5 Sheets-Sheet 5
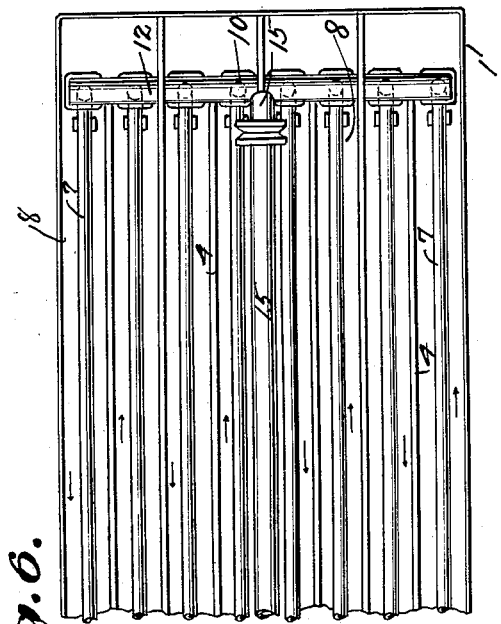
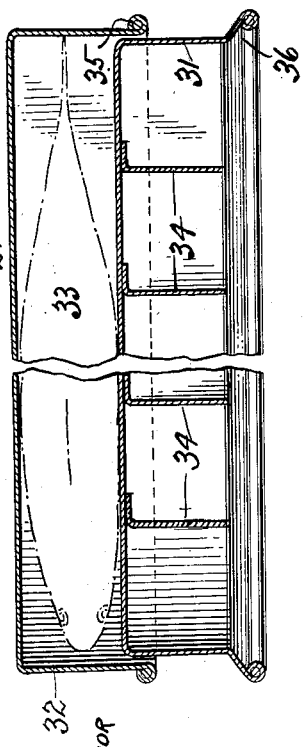
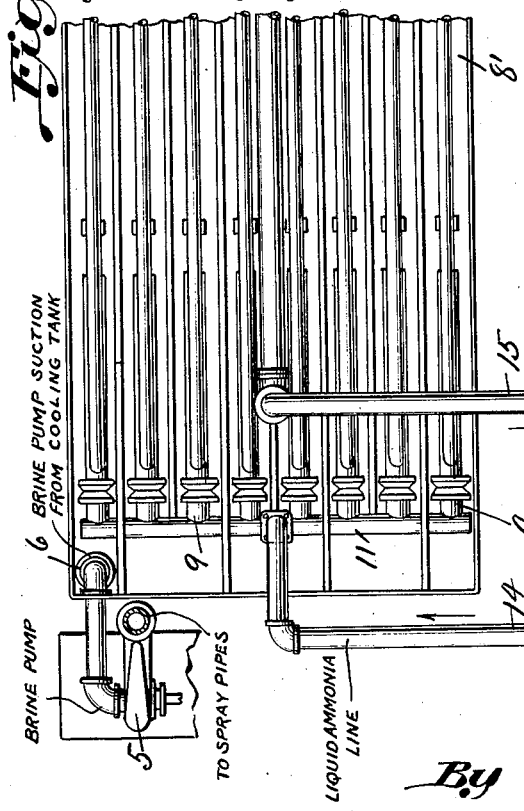
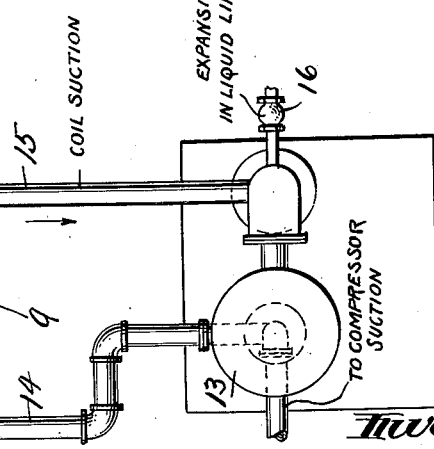

Patented Feb. 4, 1936

2,030,014

UNITED STATES PATENT OFFICE 2,030,014

METHOD AND APPARATUS FOR PRESERVING FOOD PRODUCTS

George Waldron Mathews and Cecil John Beust, Orlando, Fla.

Application April 10, 1931, Serial No. 529,134

34 Claims. (Cl. 62—114)

This invention relates to a method and apparatus for freezing food products, particularly fish, and has for its general object a thorough freezing action accomplished relatively quickly and in an economical manner by the utilization of circulating brine which is refrigerated and maintained in an improved cycle and sprayed in an improved manner on novel containers for the food products or fish.

Modern flesh-food preservation, particularly for fish, is best accomplished by rapid freezing. It has been found that slow freezing of fish results in considerable damage and the loss of much juice, containing flavor and nutriment, when defrosting occurs, because large crystals of ice form in the tissues, puncturing and breaking down the cells of the flesh-food when slow refrigeration is resorted to. On the other hand, rapid freezing prevents the formation of large ice crystals in the tissues, not puncturing and breaking down the cells and when the product is used, provided it has meanwhile been kept from temperature fluctuations, it possesses a fresh and satisfactory flavor.

Our present apparatus and method permits freezing of fish or other food products within a period of from twenty minutes to one hour, depending on the thickness, as contrasted with earlier and well-known methods which require many hours or days. With our quick freezing apparatus and process, the formation of large ice crystals in the tissues of the fish or other food product is prevented and this enables the fish to retain the original flavor, juices, and nutriment.

Our object is to provide an apparatus and method which will be substantially continuous and in which the cycle or circulation of the brine from a refrigerant cooled brine tank to refrigerating units where the brine is sprayed on covered or sealed containers for the fish, is relatively short.

To that end, the refrigerating units are preferably located immediately above an improved brine tank in which a refrigerated cooling system is located and the cold brine which is pumped into the refrigerating chambers or units flows by gravity back to the brine tank after accomplishing its freezing action on the containers located within the refrigerating chambers.

Not only is the brine tank of improved construction by which the brine is circulated therein until it is thoroughly cooled but, also, the refrigerating units or chambers have novel bottoms by which the gravitating brine that has treated the fish containers is delivered to the brine tank at a point distant from the take-off for the cold brine so that the warmer brine will have to undergo thorough cooling in the brine tank before it can be used in the refrigerating units.

Furthermore, the improved draining bottoms for the refrigerating units cover the brine tank so that, except for a spill-way or take-off for the brine which has been used in the refrigerating units, the brine in the tank is not exposed, to cause a rise in its temperature, and hence the apparatus and method are used at greatly improved thermal efficiency and capacity.

Improved containers for the fish are provided which prevent the brine sprayed on said containers from having access to the interiors of the containers, thus preventing contamination of the fish. These containers are of improved construction to accommodate fish or food products of different sizes, without possibility of the brine entering the containers.

Preferably, the refrigerating units are independent and the delivery of the brine thereto may be controlled as desired. Thus, one or more units or chambers can be opened, after the brine has been cut off therefrom, for the purpose of access to the containers within such units, without interfering with the remaining units which may continue to receive the brine.

Therefore, we consider our apparatus and method to be correctly classed as "continuous" and it is economically operated because it does not have to be shut down; furthermore, the descent of the cold brine which has been utilized for freezing purposes is by direct gravity immediately to the brine tank for re-cooling and re-use.

We have also made provision for arranging the fish containers, one above the other, independently supported and subject to sprays of cold brine which are directed against the bottoms of the containers from which the brine drips to the tops of the containers below but, in addition, the uppermost container receives the cold brine sprays on its top.

Having the foregoing, and other not specifically mentioned objects in view but which will appear hereinafter, the invention embodies the apparatus, and method hereinafter described and set forth in the claims.

In the accompanying drawings:

Fig. 4 is a horizontal section on the line 4—4 of Fig. 2;

Fig. 5 is a vertical section through the lower part of a refrigerating unit and through the brine tank and constitutes a continuation showing the lower detailed structure of Fig. 2;

Fig. 6 is a diagrammatic plan view of the brine tank, ammonia coils, pump and ammonia line; and Fig. 7 is a vertical section, broken away, through one of the fish containers.

Figure 1:
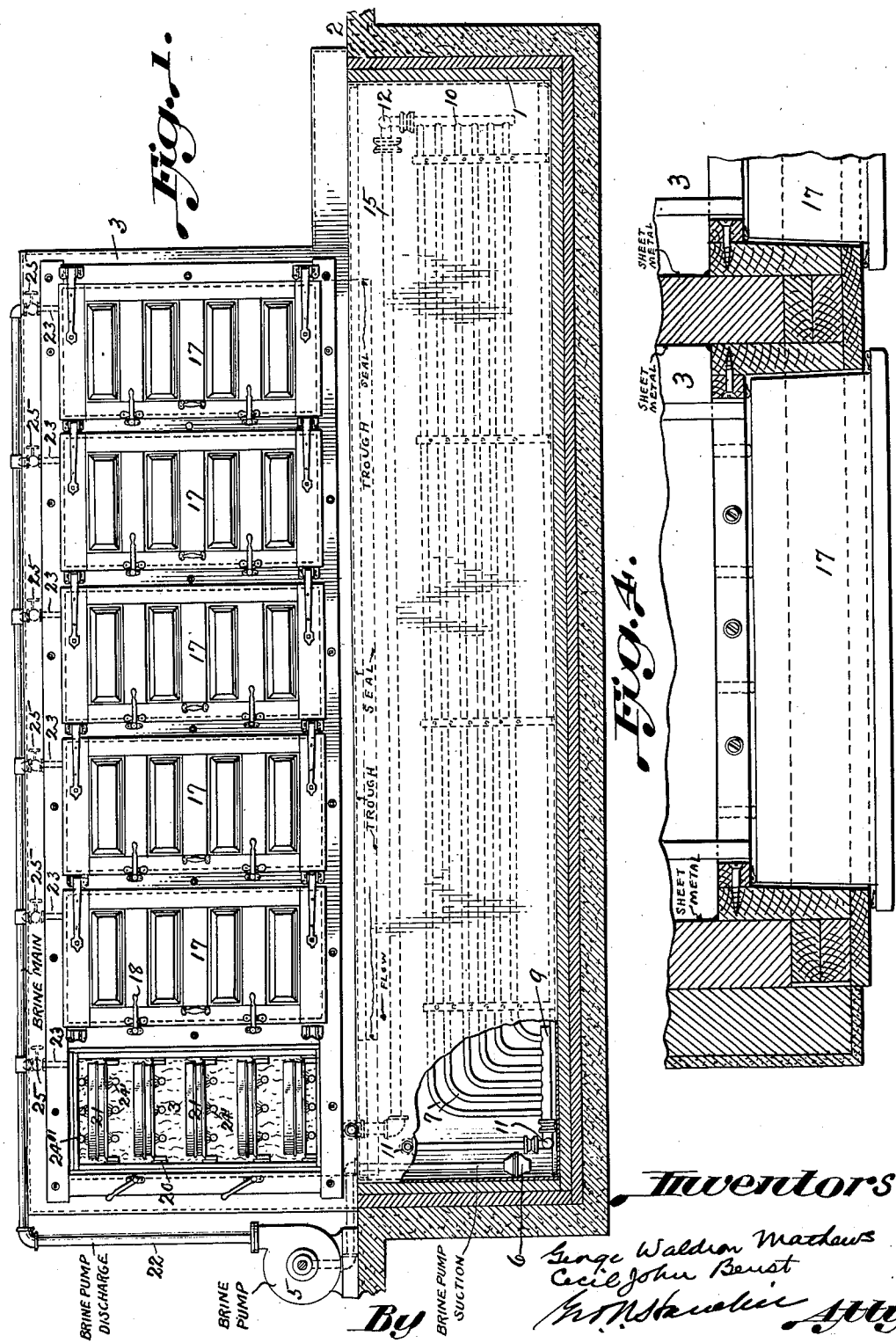
Figure 1 is a part elevation and part vertical section of the apparatus, the door of one of the refrigerating units or chambers being omitted to illustrate the action of the brine within said unit or chamber.

The brine solution, which may be calcium chloride or sodium chloride, is contained within a tank 1 of suitable material which, in turn, may be embedded in concrete below the floor level 2.

The refrigerating units, which are shown generally at 3, are disposed immediately above the tank 1 so that the brine will drain directly therefrom by gravity back into the tank 1 after it has been used in the manner hereinafter set forth. Thus, the brine circulation circuit is made relatively short, increasing the efficiency of the apparatus and method.

The tank 1 is sub-divided longitudinally by partitions 4 which, alternately, are arranged so that they extend from opposite end walls of the tank, their ends terminating short of the other end wall, thus compelling the brine to circulate back and forth, lengthwise of the tank in the direction of the arrows (Fig. 6) from its point of entry therein to the point where it is pumped up to the refrigerating units by the brine pump 5 whose foot valve appears at 6. This circulation of the brine causes it to come in contact with the stands of refrigerating coils 7 which extend lengthwise within the tank in the compartments 8 that are provided by the partitions 4.

The refrigerating coils or pipes 7 are connected to headers 9, 10, respectively connected to the cross feeders 11, 12.

A compressor suction line is connected to recirculator 13 which supplies and returns liquid refrigerant to coils 7 through pipe 14 and cross header 11. A coil suction pipe 15 connected to cross header 12, leads back to the recirculator 13. A suitable expansion valve 16 controls the liquid refrigerant line from the reservoir to the ejector incorporated in 13.

The liquid refrigerant flowing through the refrigerating pipes aforesaid, lowers the temperature of the brine in the respective compartments 8 and the warmer brine flowing by gravity from the refrigerating units 3 passing into the tank 1 at a point farthest from the foot valve 6, the brine is subjected to the cooling action of the coils throughout its complete alternating passage through the tank to the foot valve and thus is most efficiently re-cooled for re-use in the refrigerating units into which it is again pumped by pump 5.

The refrigerating chambers or units 3 are built of metal lined and well-insulated construction according to any approved plan except in respect to the novel constructions and features now to be described. In Fig. 1, we have omitted the door to one of the units to afford a clear understanding of the arrangement of the product containers and brine spray pipes therein. However, each refrigerating unit is provided with a well-insulated and fitted hinged door 17 provided with suitable locks or fasteners 18; thus, access may be had to the interior of any one or more of the refrigerating units without interfering with the use of the remaining units in the refrigerating process that is being carried on by introducing the brine into the units whose doors are closed.

While we have illustrated six units, it will be understood that any number from one upwards may be employed.

Figure 3:
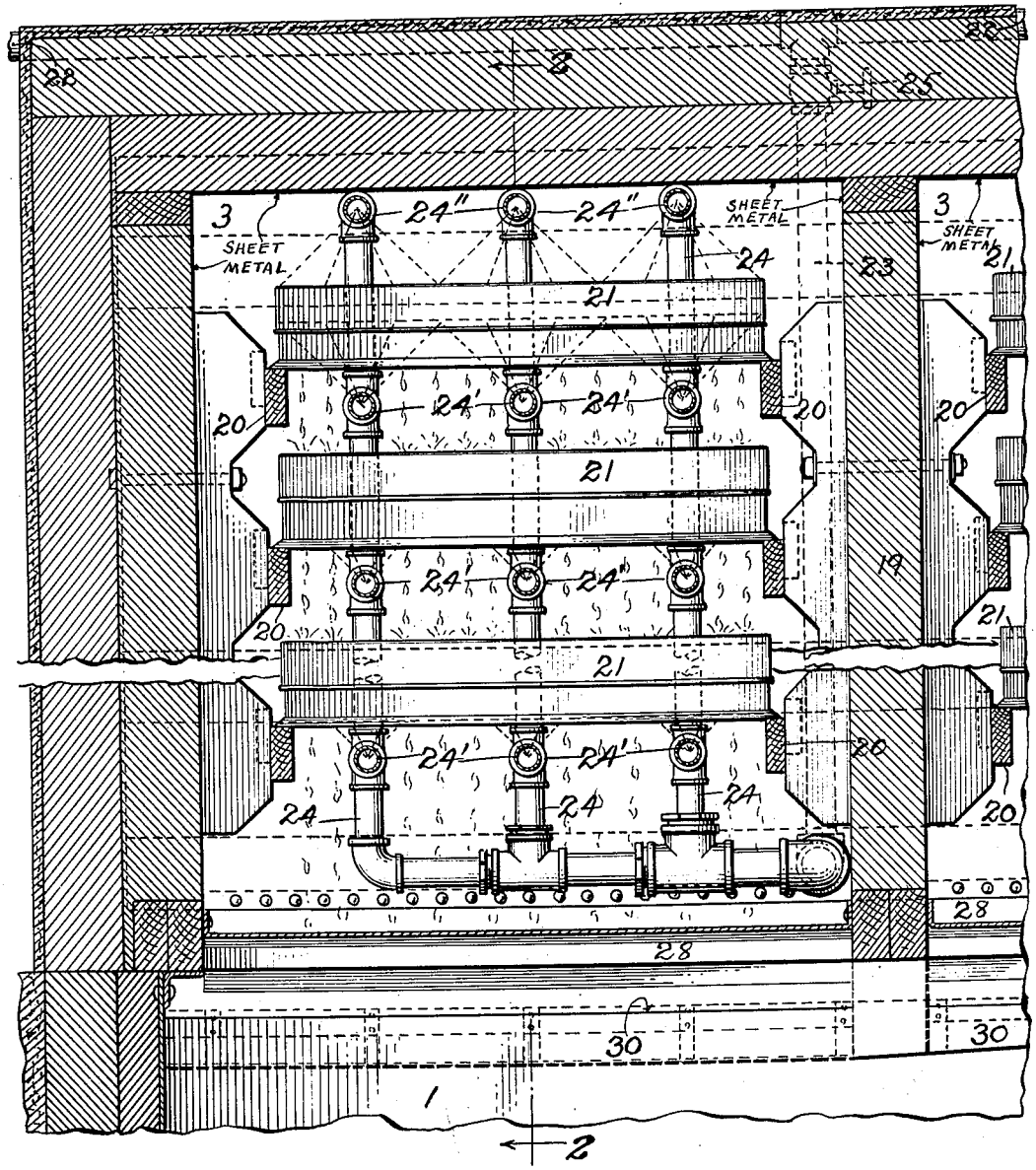
Fig. 3 is a broken-away vertical section taken on the line 3—3 of Fig. 2.

The respective units 3 are independent of each other, being separated by partitions or walls, one of which appears at 19, Fig. 3; thus, the opening of a door 17 of one unit will not permit the outer air to have access to the adjoining unit to raise the temperature therein and interfere with the cooling of the products in that unit.

Each unit 3 contains a plurality of horizontal supports 20 constituting supports and guideways for the fish or other food product containers 21 which are shown in detail in Fig. 7, whose construction will be described later.

Figure 2:
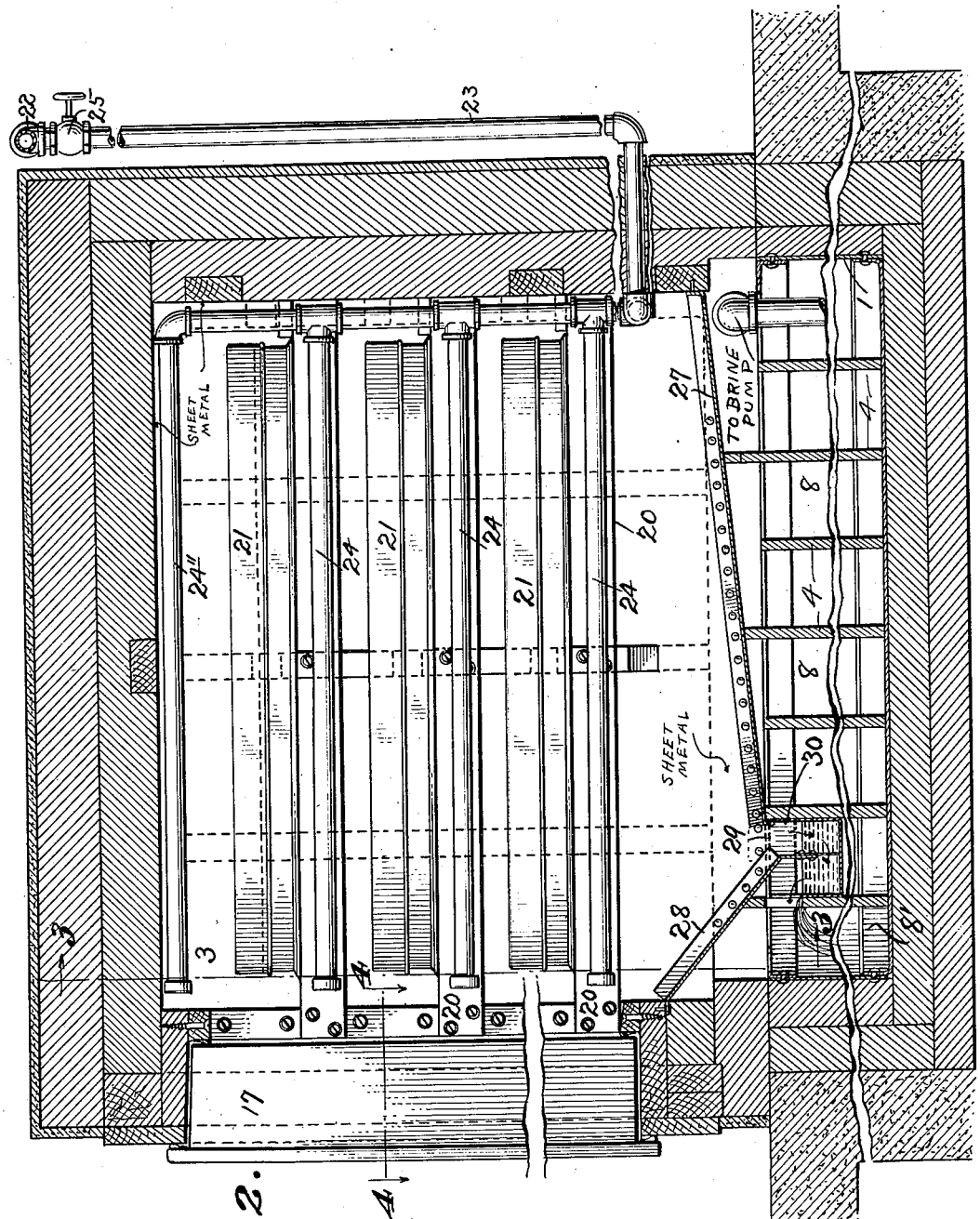
Fig. 2 is a broken-away vertical section taken on the line 2—2 of Fig. 3.

The supports 20 enable the fish containers 21 to slide horizontally into, or out of, the refrigerating unit and to be disposed in spaced relationship, one above the other, when located therein, as shown in Figs. 2 and 3.

The brine pump 5, sucking up the cooled brine from tank 1 through foot valve 6, pumps the cold brine into a main feeder pipe 22 which has branch pipes 23 leading to the system of spray pipes 24 which deliver the sprays of brine against the bottoms of containers 21 and down on the top of the uppermost container. Each pipe 23 is controlled by a valve 25; consequently, the feed of the brine to any given refrigerating unit 3 may be regulated, opened, or shut off without interfering with the control of the brine to any other refrigerating unit. By providing these controlling valves, any one of the doors 17 may be opened and the containers 21 introduced into chamber 3 or removed therefrom, without interfering with the continuity of treatment in the other units 3, whose doors may remain closed.

Referring more particularly to Fig. 3, the perforated brine-spray pipes 24' deliver the spray upwardly against the bottoms of the containers 21, the sprayed brine then falling on top of the container 21 immediately therebelow and dropping to the bottom of the chamber or unit 3. Other perforated brine-spray pipes 24" which are located above the uppermost container 21, deliver the sprays of cold brine down on top of th uppermost container, from which the brine descends to the bottom of the chamber 3.

The bottom of the refrigerating chamber or unit 3 is sealed from the top of the tank 1, independently of the sealing of each of the other chambers from the tank but each chamber 3 is provided with special means for draining the brine that has treated the containers 21 so that the brine will have access to the tank 1 at a point farthest from the suction foot valve 6. The provision of the means now to be described causes the brine descending from each chamber to enter th tank 1 at a point where it will be compelled to travel back and forth in the compartments 8 and between the partitions 4 so that it will be subjected to the cooling effect of all of the refrigerating coils before it can again be pumped up by the brine pump 5. The bottom of each chamber or unit 3 comprises a long sloping plate 27 extending from the rear toward the front thereof, and a short sloping plate 28 extending from the front downwardly. The plates 27, 28 are separated by a gap 29 through which the brine descends into a brine sealed trough 30. From the trough, the overflow of the brine spills into the compartment 8' which is farthest from the foot valve 6. The brine which has been sprayed on the containers in each compartment 3 is thus returned to the brine tank 1 for re-cooling and re-use in the shortest manner possible.

The containers 21 are of the construction shown in Fig. 7, comprising a hollow tray 31 and a hollow cover 32 adjustably telescoping over the tray 31, said tray and cover facing in the same direction. The fish or other food product 33 which is to be preserved is, as shown in dot and dash lines, placed upon the top of the tray 31 and the cover 32 is then telescoped over tray 31 to enclose the fish 33.

The telescoping construction of the container enables a relatively wide range of thicknesses of the products 33 to be accommodated, according to circumstances, while preserving the sealed condition of such product. The covers 32 are preferably of somewhat flexible and relatively thin metal so that they may weave, warp, or de-form to accommodate themselves to the product 33 and more effectively encase and seal the product.

The trays 31 are of heavier metal in order that they may sustain the weight imposed upon them by the fish or food product 33. Extending across, and within, the interior of the tray 31 are regular braces 34 which stiffen the tray so that it will withstand the weight imposed upon it.

The cover 32 is provided with an external bead 35 extending therearound which stiffens its edge and prevents it from getting permanently out of shape.

The supporting tray 31 has an outwardly flaring skirt or base 36 which is provided with a bead and not only constitutes a strong supporting base but also prevents the brine sprayed against the bottom of the tray from having access to the interior of the cover 32 to contaminate the food product 33.

The metal braces 34 not only truss the tray 31 but they also serve as a heat-conducting means to facilitate the refrigerating action, by increasing the radiating surface and resulting contact with cooled brine.

What we claim is:

1. A food product container adapted for use in a preserving apparatus in which provision is made for subjecting the containers to a liquid refrigerant, comprising a hollow supporting tray provided with a top and sides containing internal bracing and heat conducting trusses, and a hollow cover telescoped in relation to the tray and adapted to enclose the food product supported by the tray.

2. A food product container adapted for use in a preserving apparatus in which provision is made for subjecting the containers to a liquid refrigerant, comprising a hollow food product supporting tray having a flared skirt-like base and internal ribs which constitute trusses and heat conductors, and a hollow inverted inherently flexible cover telescoped over the hollow tray and adapted to enclose the food product supported by the tray.

3. In an apparatus for preserving food products, the combination with a brine tank, and means for cooling the brine therein, of a refrigerating chamber located over the brine tank, food product containers located within the said chamber, said chamber having a draining outlet for the brine which covers the brine tank except at the passageway part of said draining outlet, means for taking off cooled brine from the tank and delivering it to the refrigerating chamber for use in connection with the food product containers therein, said brine take-off being located at a point of the tank which is distant from the point where the brine passes from the draining outlet of the refrigerating chamber into the tank, whereby the warmer brine draining from the refrigerating chamber to the tank is made to circulate through the tank and to be cooled by the aforesaid brine-cooling means before it is taken from the tank for use in the refrigerating chamber.

4. In an apparatus for preserving food products, a brine-cooled refrigerating chamber having a brine-sealed draining bottom comprising inclined sections provided with a brine-sealed gap between their contiguous parts for the draining off of the brine from said chamber without permitting entry of air into said chamber.

5. In an apparatus for preserving food products, a refrigerating unit having a draining bottom comprising two inclined sections provided with a gap or outlet between their contiguous parts, in combination with a brine tank located below said unit from which said unit derives its brine for refrigerating purposes, a brine seal into which the brine drains from the contiguous parts of the two aforesaid inclined sections and from which the brine passes to the brine tank at a point distant from the outlet or take-off from said tank to said refrigerating unit.

6. In an apparatus for preserving food products, the combination with a brine tank, of a plurality of sealed independent refrigerating chambers located above the brine tank and sealed against inter-communication, said refrigerating chambers having independent draining bottoms for the passage of the brine, after use therein, to the tank, means affording independent access to the interiors of the respective refrigerating chambers, and means for independently supplying, regulating, or cutting off, brine to the respective refrigerating chambers, whereby each chamber may be operated or access had thereto, independently of the remaining chambers, thereby enabling a continuous refrigerating action to be carried on.

7. In an apparatus for preserving food products, a refrigerating chamber in which are located independent removable food product containers, arranged one above the other in spaced relationship, and means for directing liquid refrigerant against the bottoms of said containers, whence the refrigerant passes to the top of the container beneath it.

8. In an apparatus for preserving food products, a refrigerating chamber in which are located independent removable food product containers, arranged one above the other in spaced relationship, means for directing liquid refrigerant against the bottoms of said containers, whence the refrigerant passes to the top of the container beneath it, and means for directing liquid refrigerant on top of the uppermost container, whence the refrigerant passes downwardly.

9. In an apparatus for preserving food products, a refrigerating chamber, in combination with independent food product containers independently and removably supported within said chamber, said containers comprising a tray and a cover telescopically related and adapted to contain the food product, said containers being arranged one above the other, and means for subjecting the bottoms of the said containers to the liquid refrigerant, whence it freely descends to the container beneath the one treated, to cool the bottoms and tops of the containers below.

10. In an apparatus for preserving food products, a refrigerating chamber, in combination with independent food product containers independently and removably supported within said chamber, said containers comprising a tray and a cover telescopically related and adapted to contain the food product, said trays being provided with an enlarged base and being located one above the other, means for subjecting the bottoms of the said containers to the liquid refrigerant, whence it freely descends to the top of the container therebelow, said enlarged bases of containers preventing the refrigerant from having access to the interiors of the covers of the containers, and means for taking off the refrigerant from the chamber.

11. In an apparatus for preserving food products, the combination with a brine tank, of a plurality of sealed independent refrigerating chambers located above the brine tank, sealed against inter-communication and having means for draining the brine therefrom into said tank, closures for the respective chambers affording independent access to said chambers, means for independently supplying, regulating, or cutting off, brine taken from said tank and delivered to said chambers, and removable food product containers within said chambers, said chambers being adapted for independent, or collective, use, thereby enabling a continuous refrigerating action to be carried on by the apparatus.

12. In an apparatus for preserving food products, a refrigerating chamber, in combination with a plurality of independent food product containers mounted therein, one above the other, means for applying a liquid refrigerant to the bottoms of said containers so that it will successively pass from one container to another container, and a closure for said chamber.

13. A food product container adapted for use in a preserving apparatus in which provision is made for subjecting the containers to a liquid refrigerant, comprising a pair of inverted trays, the uppermost one of which is telescoped over the lowermost one of said pair, the lowermost tray having its upper surface adapted to support the food product and the uppermost tray being adapted to enclose the food product, said pair of trays providing an expansible and contractible food product holding compartment within said uppermost tray.

14. A food product container adapted for use in a preserving apparatus in which provision is made for subjecting the containers to a liquid refrigerant, comprising an inner member whose upper part is adapted to support the food product, and a cover telescoped over said inner member, which is adapted to enclose the food product supported by the latter, thereby providing an expansible and contractible food product holding compartment within the said cover, said inner member being provided with an enlarged base which prevents the liquid refrigerant used in the preserving apparatus from having access to the interior of the food product holding compartment aforesaid.

15. A food product container adapted for use in a preserving apparatus in which provision is made for subjecting the containers to a liquid refrigerant, comprising an inner member whose upper part is adapted to support the food product, and an outer cover telescoped over said inner member, which is provided with an inherently flexible top adapted to flex to conform to the food product enclosed by said cover, said telescoped cover and inner member collectively providing an expansible and contractible food product holding compartment within the said cover.

16. The method of preserving food products consisting in directing a liquid refrigerant onto the tops and bottoms of food product containers located within a refrigerating chamber, and also causing the liquid refrigerant to drip from one container to another container.

17. The method of preserving food products consisting in supplying liquid refrigerant successively to a plurality of food product containers located one above the other in a refrigerating chamber, characterized by subjecting the bottoms of the containers to the direct application of liquid refrigerant and the tops thereof to the gravity drip of the refrigerant from a higher to a lower container in said chamber.

18. In an apparatus for preserving food products wherein means are provided for applying a liquid refrigerating medium upwardly against the bottom thereof, together with supporting means therefor, a dual member food-product-receptacle comprising a lower food-product-supporting hollow inverted pan-like member and an upper hollow inverted pan-like covering member, both members being substantially of the same form and telescopically related to each other and facing in the same direction, thus providing an expansible and contractible food-product-holding-compartment therebetween.

19. In an apparatus for preserving food products wherein means are provided for applying a liquid refrigerating medium upwardly against the bottom thereof, together with supporting means therefor, a dual member food-product-receptacle comprising a hollow inverted pan-like lower supporting member provided with an outwardly extending flared or flanged-like base and an upper hollow inverted pan-like covering member, both members otherwise being substantially of the same form and telescopically related to each other and facing in the same direction, thus providing an expansible and contractible food-product-holding-compartment therebetween, and means for automatically preventing the heat conducting medium from access thereto.

20. In an apparatus for preserving food products wherein means are provided for applying a liquid refrigerating medium upwardly against the bottom thereof, together with supporting means therefor, a dual member food-product-receptacle comprising a lower substantially rigid supporting member and an upper inherently flexible covering member, both members being telescopically related to each other and facing in the same direction, the flexibility of the covering member permitting it to conform, more or less, to the food product supported by the lower member.

21. In an apparatus for preserving food products wherein means are provided for applying a liquid refrigerating medium upwardly against the bottom thereof, together with supporting means therefor, a dual-member, non-buoyant, non-submergible and non-airtight food-product-receptacle comprising a hollow inverted pan-like lower supporting member and an inverted hollow telescopic upper covering member facing in the same direction, said upper member providing between itself and the lower member a food-product-holding-compartment.

22. In an apparatus for preserving food products wherein means are provided for applying a liquid refrigerating medium upwardly against the bottoms thereof, together with supporting means therefor, a dual-member food-product-receptacle comprising a lower hollow inverted pan-like supporting member provided with internal ribs or fins externally exposed to the liquid refrigerating medium which constitute heat conducting trusses, together with an outwardly extending flanged base, and an upper hollow inverted pan-like inherently flexible, or product-conforming covering member, both members being telescopically related to each other, thus providing an expansible and contractible food product compartment therebetween and means automatically preventing the liquid refrigerating medium having access thereto.

23. In an apparatus for preserving food products wherein means are provided for applying a liquid refrigerating medium to either or all surfaces thereof, together with supporting means therefor, a dual-member food-product-receptacle comprising a lower hollow inverted pan-like supporting member provided with internal ribs or fins externally exposed to the liquid refrigerating medium, which constitute heat conducting trusses, together with an outwardly extending flanged base, and an upper hollow inverted pan-like inherently-flexible, or product-conforming, covering member, both members being telescopically related to each other, thus providing an expansible and contractible food product compartment therebetween, and means automatically preventing the liquid refrigerating medium having access thereto.

24. In an apparatus for preserving food products, a refrigerating chamber provided with independent food-product-receptacles arranged one above the other in spaced relationship, means for applying a liquid refrigerating medium against the bottoms of said receptacles, whence the applied liquid refrigerating medium falls to the top of the receptacle beneath it, and whence the applied liquid refrigerating medium passes downwardly to means for removing it from the chamber.

25. In an apparatus for preserving food products, a refrigerating cabinet chamber, in combination with independent food-product-containers, independently and removably supported therein, said containers comprising a hollow inverted pan-like tray for supporting the food product and a cover telescoped over the tray and providing between itself and the tray a compartment for the product, and being located one above the other and facing in the same direction, means to apply a liquid refrigerant against the bottoms of the said containers whence it descends to the tops of the containers beneath, and means for discharging the applied refrigerant from the chamber through its bottom.

26. In an apparatus for preserving food products, the combination with a brine tank, of a sealed refrigerating chamber, independently removable stationarily supported food product containers located within said sealed chamber, means for delivering the brine from the interior of the refrigerating chamber and directing it independently against the respective food product containers, and means effecting communication between the refrigerating chamber and the brine tank for the return of the brine to the tank from said refrigerating chamber after use in said chamber, without exposure of the brine to air while in transit.

27. In an apparatus for preserving food products, a sealed refrigerating chamber, independently removable food product containers stationarily supported in said sealed chamber, brine-supplying-means for directing brine against the respective food containers, and a brine-sealed draining outlet through which the brine passes after use in the refrigerating chamber.

28. In an apparatus for preserving food products, a plurality of independent refrigerating chambers, each having a brine-sealed draining outlet through which the brine passes after use in said chamber, and a brine take-off extending approximately throughout and common to all of said plurality of chambers and into which all of said draining outlets discharge for passage therethrough.

29. In an apparatus for preserving food products, a refrigerating chamber having a brine outlet extending transversely thereof, a trough extending longitudinally of said brine outlet, and having a longitudinal partition therein, one side of which is in communication with the brine outlet with an opening under said partition to the other side thereof.

30. In an apparatus for preserving food products, a refrigerating chamber having converging sloping bottom sections with adjacent edges thereof spaced apart forming a transversely extending gap therebetween at their lowest point, a partition extending downwardly from one of said edges along said gap, and a brine trough receiving said partition and co-operating therewith forming a brine-sealed brine outlet.

31. The method of preserving food products in containers in a refrigerating chamber, comprising arranging said containers at different heights in said refrigerating chamber, directing a liquid refrigerant against the tops, sides, and bottoms of a series of said containers in a manner to cause the liquid refrigerant to fall by gravity from one container of the series to another container thereof in addition to the direct application of the refrigerant to the containers.

32. A food product support adapted for use in a preserving apparatus in which provision is made for subjecting the supports to a liquid refrigerant, comprising a hollow supporting tray provided with a top and sides and containing within itself internal bracing and heat conducting trusses.

33. A food product container adapted for use in a preserving apparatus in which provision is made for subjecting the containers to a liquid refrigerant, comprising an inner member whose upper part is adapted to support the food product, and a hollow cover adjustably telescoped over said inner member, which is adapted to enclose the food product supported by the latter, thereby providing a food product holding compartment within said cover which is expansible and contractible in size and is located above the upper part of the inner member.

34. In an apparatus for preserving food products wherein means are provided for applying a liquid refrigerating medium upwardly against the bottom thereof, together with supporting means therefor, a dual member food-product-receptacle comprising a lower hollow food-product-supporting member and an upper hollow covering member, said members being substantially of the same form and telescopically related to each other and facing in the same direction in inverted position, thus providing an extensible and contractible food-product-holding compartment therebetween.

CECIL J. BEUST.
GEORGE WALDRON MATHEWS.